(12) United States Patent
Dotter

(10) Patent No.: US 11,014,016 B2
(45) Date of Patent: May 25, 2021

(54) ELECTRIC WATER DESALINATION ASSEMBLY

(71) Applicant: Jay Dotter, West Newton, PA (US)

(72) Inventor: Jay Dotter, West Newton, PA (US)

( * ) Notice: Subject to any disclaimer, the term of this patent is extended or adjusted under 35 U.S.C. 154(b) by 0 days.

(21) Appl. No.: 16/662,950

(22) Filed: Oct. 24, 2019

(65) Prior Publication Data
US 2021/0121792 A1    Apr. 29, 2021

(51) Int. Cl.
| | | |
|---|---|---|
| *B01D 1/00* | (2006.01) | |
| *C02F 1/04* | (2006.01) | |
| *C02F 1/14* | (2006.01) | |
| *B01D 5/00* | (2006.01) | |
| *H02S 10/12* | (2014.01) | |
| *F03D 9/00* | (2016.01) | |
| *H01M 10/46* | (2006.01) | |
| *B01D 1/04* | (2006.01) | |
| *C02F 103/08* | (2006.01) | |

(52) U.S. Cl.
CPC ......... *B01D 1/0017* (2013.01); *B01D 1/0035* (2013.01); *B01D 1/0047* (2013.01); *B01D 5/006* (2013.01); *C02F 1/047* (2013.01); *C02F 1/14* (2013.01); *F03D 9/007* (2013.01); *F03D 9/008* (2013.01); *H01M 10/465* (2013.01); *H02S 10/12* (2014.12); *C02F 2103/08* (2013.01); *C02F 2201/009* (2013.01); *F05B 2220/62* (2013.01); *H01M 2220/10* (2013.01)

(58) Field of Classification Search
CPC .. B01D 1/0017; B01D 1/0035; B01D 1/0047; B01D 5/006; C02F 1/047; C02F 1/14; C02F 2103/08; C02F 2201/009; H01M 10/465; H01M 2220/10; H02S 10/12; F03D 9/007; F03D 9/008; F05B 2220/62
See application file for complete search history.

(56) References Cited

U.S. PATENT DOCUMENTS

| | | |
|---|---|---|
| 4,141,825 A | 2/1979 | Conger |
| 9,227,853 B2 | 1/2016 | Ghosh |
| 2013/0291532 A1* | 11/2013 | Chen ........................ F03D 9/007 60/495 |
| 2013/0327711 A1 | 12/2013 | Hickenbottom |

\* cited by examiner

*Primary Examiner* — Brian A McCaig

(57) ABSTRACT

An electric water desalination assembly for desalinating water without burning fossil fuels includes an evaporator and a renewable electrical power generation system. The renewable electrical power generation system is electrically coupled to the evaporator for providing power to the evaporator. The evaporator is fluidly coupled to a source of salt water for boiling the salt water into desalinated steam. Additionally, the evaporator is fluidly coupled to the water desalination system for processing the desalinated steam into freshwater. Additionally, the water desalinating system is fluidly coupled to a freshwater distribution system. In this way the freshwater distribution system receives freshwater from the water desalination system.

6 Claims, 4 Drawing Sheets

ELECTRIC WATER DESALINATION ASSEMBLY

CROSS-REFERENCE TO RELATED APPLICATIONS

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to desalination devices and more particularly pertains to a new desalination device for desalinating water without burning fossil fuels.

BRIEF SUMMARY OF THE INVENTION

An embodiment of the disclosure meets the needs presented above by generally comprising an evaporator and a renewable electrical power generation system. The renewable electrical power generation system is electrically coupled to the evaporator for providing power to the evaporator. The evaporator is fluidly coupled to a source of salt water for boiling the salt water into desalinated steam. Additionally, the evaporator is fluidly coupled to a water desalination system for processing the desalinated steam into freshwater. Additionally, the water desalinating system is fluidly coupled to a freshwater distribution system. In this way the freshwater distribution system receives freshwater from the water desalination system.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
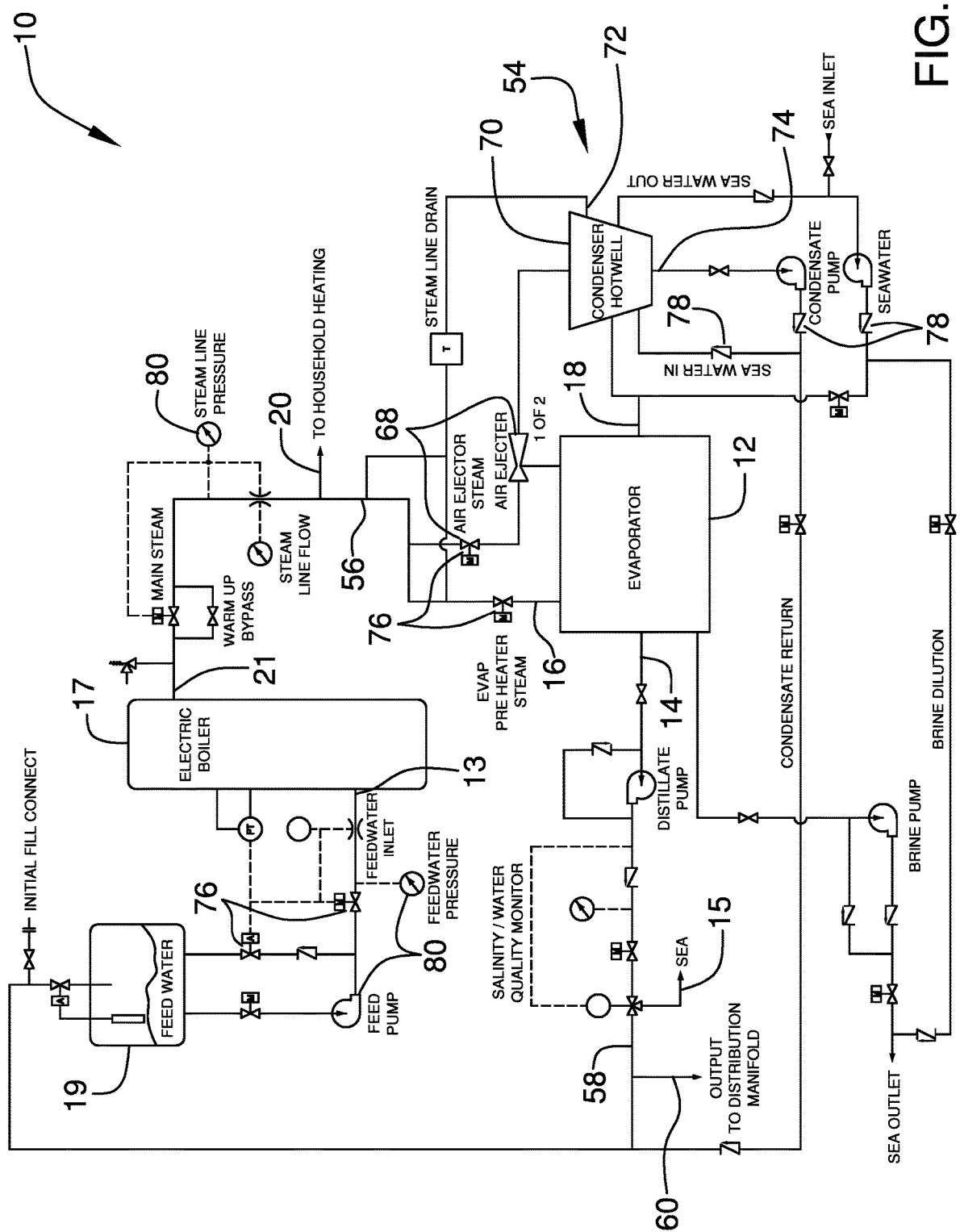
FIG. 1 is a schematic view of a steam and fluid cycle of an electric water desalination assembly according to an embodiment of the disclosure.
Figure 2:
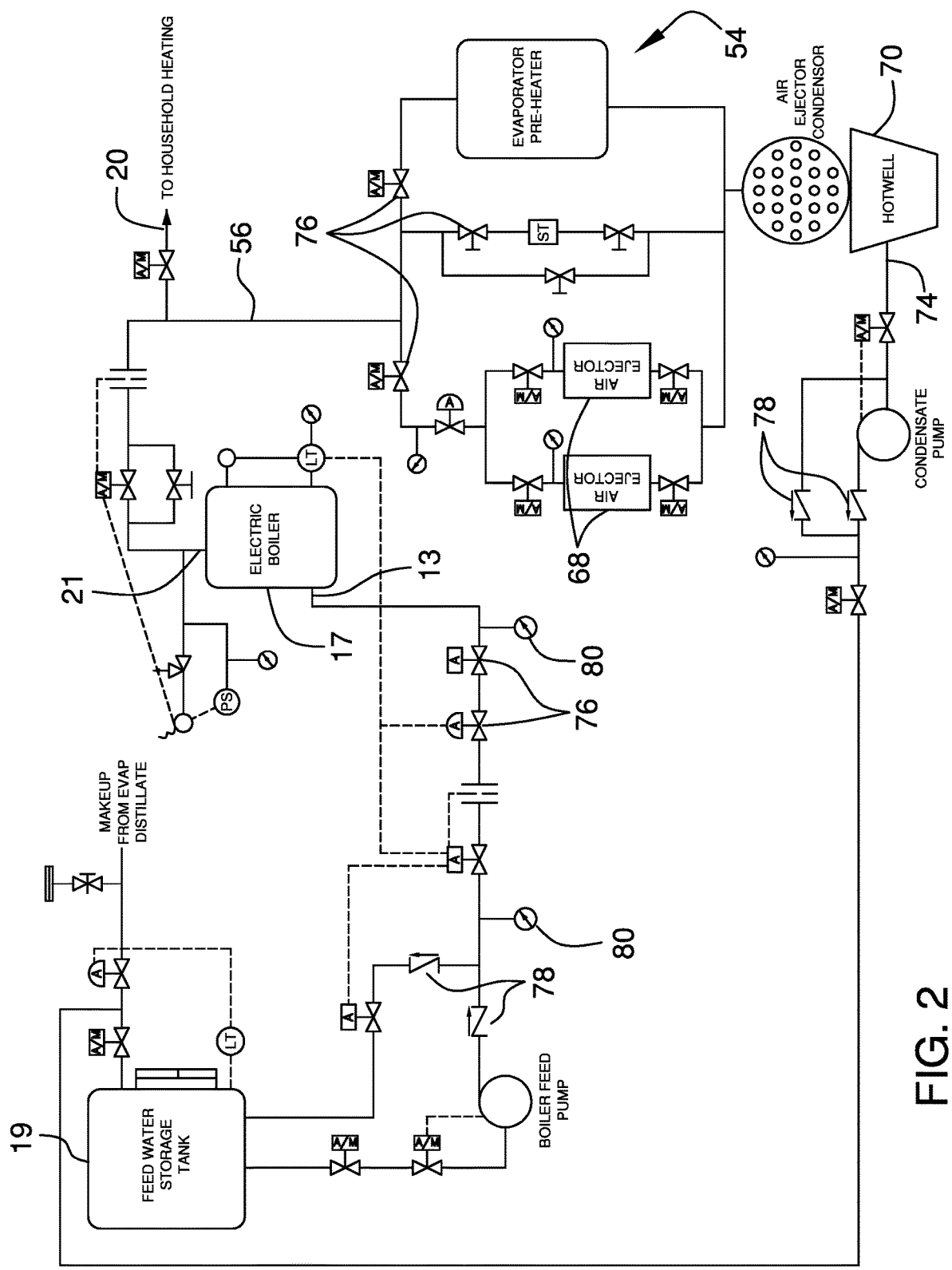
FIG. 2 is a schematic view of steam cycle of an embodiment of the disclosure.
Figure 3:
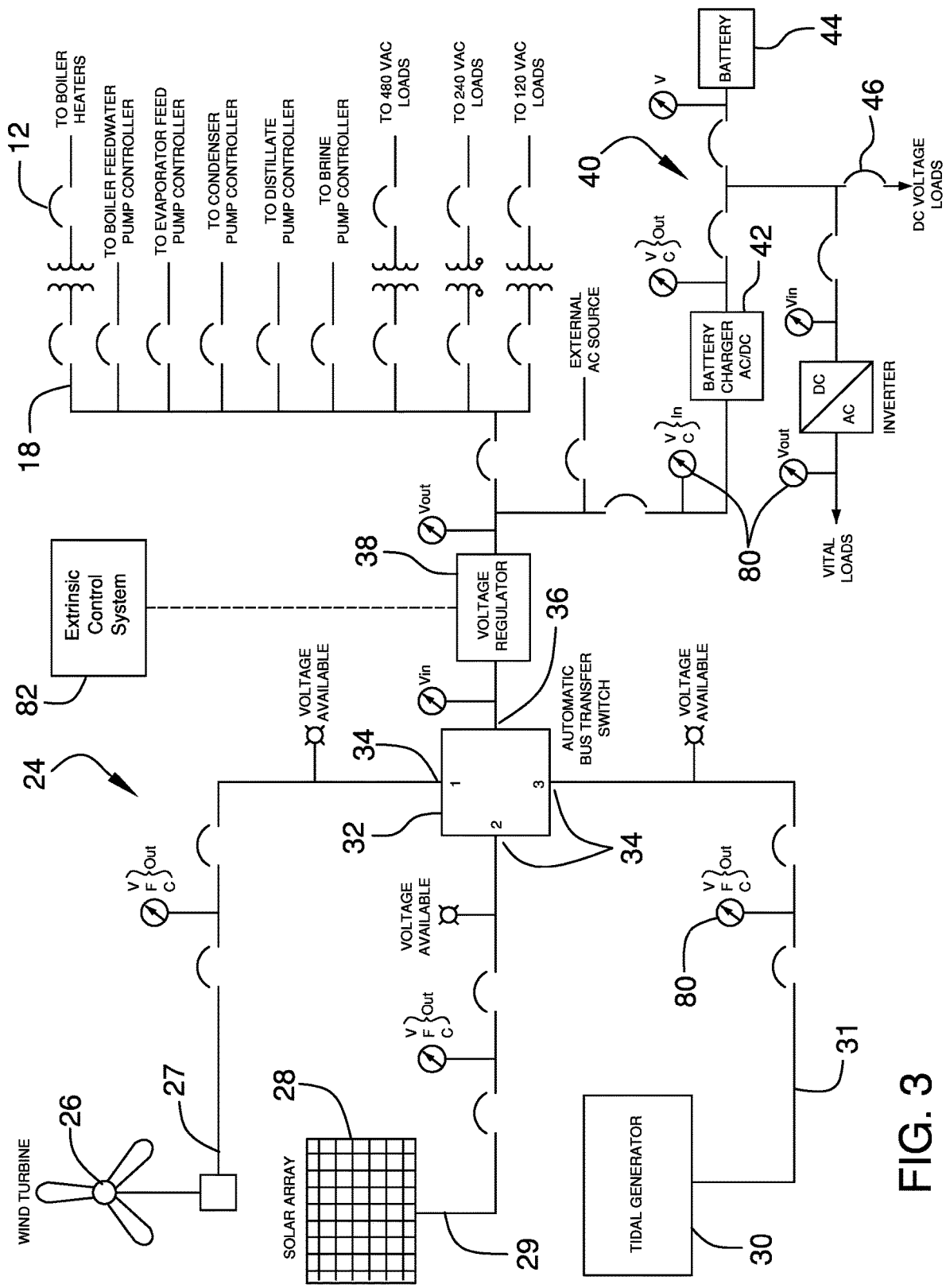
FIG. 3 is a schematic view of electrical circuitry of an embodiment of the disclosure.
Figure 4:
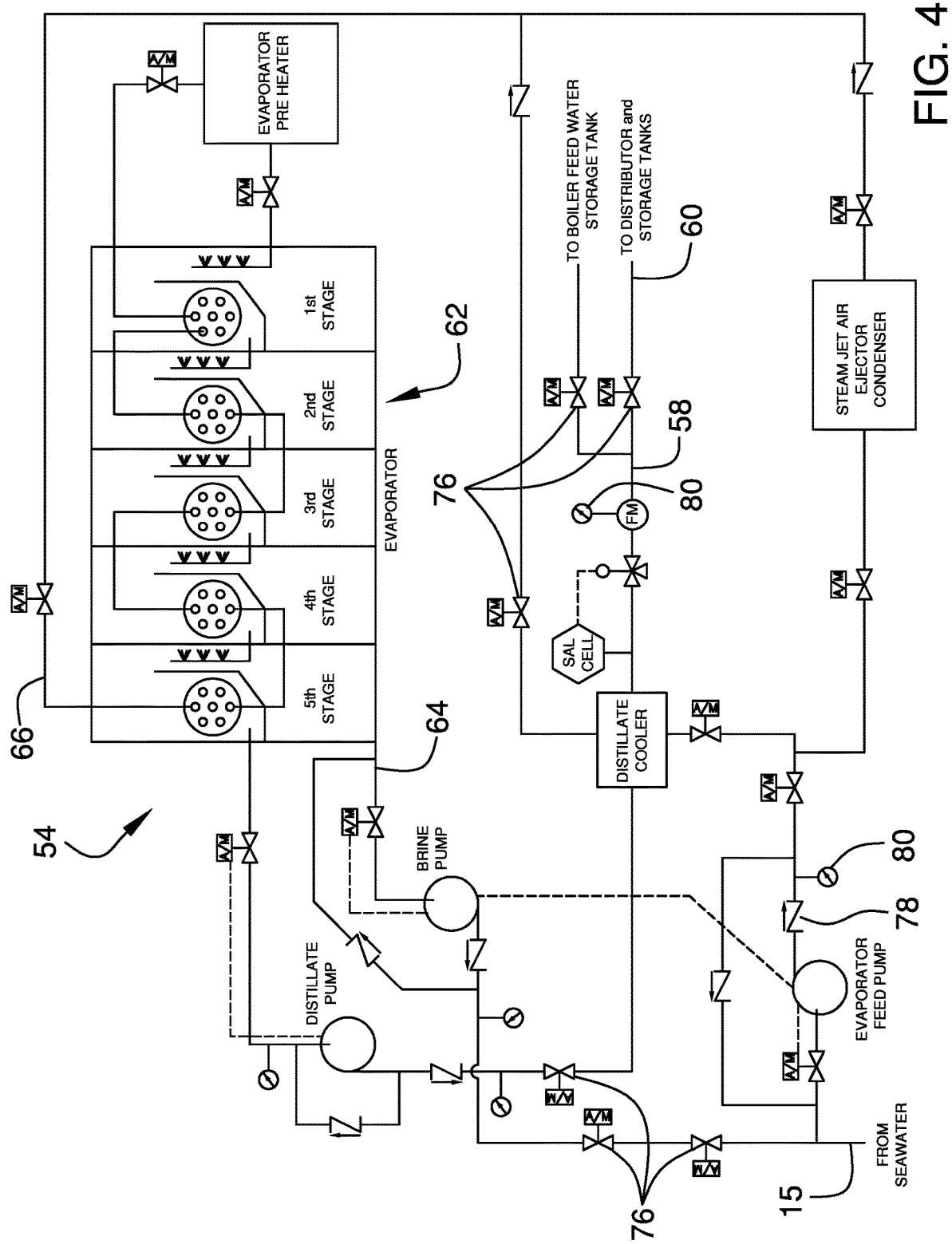
FIG. 4 is a schematic view of distillation cycle of an embodiment of the disclosure.

With reference now to the drawings, and in particular to FIGS. 1 through 4 thereof, a new desalination device embodying the principles and concepts of an embodiment of the disclosure and generally designated by the reference numeral 10 will be described.

As best illustrated in FIGS. 1 through 4, the electric water desalination assembly 10 generally comprises an evaporator 12 that has an output 14, a steam input 16 and a fluid input 18. Additionally, the evaporator 12 includes an electric boiler 17. The electric water desalination assembly additionally includes a feed water storage tank 19. The output 14 of the evaporator 12 is fluidly coupled to the feed water storage tank 19 and the electric boiler 17 is fluidly coupled to the feed water storage tank 19. The evaporator 12 may be a vacuum flash type evaporator with a heat and fluid capacity sufficient to supply the heat and fluid needs of a water desalination system. Additionally, the evaporator 12 is fluidly coupled to a salt water source 15, such as an ocean, for boiling salt water 15 into desalinated steam that is subsequently condensed into freshwater with the evaporator 12 is operated.

The steam pressure produced in the evaporator 12 may be controlled by cycling the electric power input to the evaporator 12 predetermined frequencies and durations. The electric boiler 17 has an input 13 and an output 21 and the electric boiler 17 is fluidly coupled to a household heating system 20 thereby facilitating the household heating system 20 to capture heat from the electric boiler 17.

A renewable electrical power generation system 24 is included and the renewable electrical power generation system 24 is electrically coupled to the output 14 of the evaporator 12 for providing power to the evaporator 12. The renewable electrical power generation system 24 comprises a plurality of wind turbines 26 for converting wind energy to electrical energy. The plurality of wind turbines 26 has a power output line 27 and the plurality of wind turbines 26 may be wind turbines 26 of any conventional design commonly employed in the production of clean energy.

The renewable electrical power generation system 24 includes a solar cell array 28 that is exposed to sunlight for converting solar energy to electrical energy. The solar cell array 28 has a power output line 29 and the solar cell array 28 may be a solar cell array 28 of any conventional design that is commonly employed in the production of clean energy.

The renewable electrical power generation system 24 further includes a tidal generator 30 that is positioned in an ocean for converting tidal energy into electrical energy. The tidal generator 30 has a power output 31 line and the tidal generator 30 may be a tidal generator 30 of any conventional design which is capable of harnessing ocean wave energy and ocean tidal energy for the purposes of the production of clean energy.

The renewable electrical power generation system 24 further includes a bus transfer switch 32 that has an input 34 and an output 36. The output line 27, 29, 31 of each of the plurality of wind turbines 26, the solar cell array 28 and the tidal generator 30 is electrically coupled to the input 34 of the bus transfer switch 32. In this way the bus transfer switch 32 receives the electrical energy produced by each of the wind turbines 26, the solar cell array 28 and the tidal generator 30. A voltage regulator 38 is electrically coupled to the output of the bus transfer switch 32 to regulate voltage of the electrical energy produced by each of the wind turbines 26, the solar cell array 28 and the tidal generator 30. The voltage regulator 38 is electrically coupled to the output 14 of the evaporator 12 to supply electrical power to the evaporator 12. Each of the bus transfer switch 32 and the voltage regulator 38 may be electrical components that are common to water desalination systems.

The renewable electrical power generation system 24 includes a battery charging system 40. The battery charging system 40 includes a battery charger 42 and at least one battery 44. The battery charger 42 is electrically coupled between the voltage regulator 38 and the at least one battery 44 such that the battery charger 42 charges the at least one battery 44. Moreover, the at least one battery 44 is electrically coupled to a DC voltage circuit 46 for supplying DC voltage to the DC voltage circuit 46. The DC voltage circuit 46 may be a DC voltage circuit that is common to control systems of conventional water desalination systems.

A water desalination system 54 is included in the embodiment and the water desalination system 54 is employed to desalinate the salt water 15. The water desalination system 54 has an inlet circuit 56 and an outlet circuit 58. Moreover, the steam input 16 of the evaporator 12 is fluidly coupled to the inlet circuit 56. In this way the water desalination system 54 can process the desalinated steam from the evaporator 12 into freshwater. Additionally, the outlet circuit 58 is fluidly coupled to a freshwater distribution system 60. Thus, the freshwater distribution system 60 can receive freshwater from the water desalination system 54. The freshwater distribution system 60 may be a distribution manifold of a municipal water facility, a water supply of an individual building or any other type of freshwater distribution system.

The water desalination system 54 includes a plurality of air ejectors 68. Each of the air ejectors 68 is fluidly coupled to the output 21 of the electric boiler 17 for producing vacuum pressure. Additionally, each of the air ejectors 68 receives steam from the electric boiler 17 at a pressure of at least 200.0 psi. The air ejectors 68 may be grouped into a pair of sets, comprising an operational set and a backup set. Thus, in the event of a failure of the operational set, the backup set can be actuated to continue normal operation while the operational set is serviced or replaced.

The water desalination system 54 includes a condenser 70 that has an inlet 72 and an outlet 74. The inlet of the condenser 70 is fluidly coupled to the evaporator 12 for receiving steam from the evaporator 12. Thus, the condenser 70 condenses the steam into freshwater. Additionally, each of the air ejectors 68 is fluidly coupled to the inlet 72 of the condenser 70 thereby facilitating the condenser 70 to receive the vacuum pressure for operational purposes. The outlet 74 of the condenser 70 is fluidly coupled to the freshwater distribution system 60 to deliver the condensed freshwater to the freshwater distribution system 60.

The feed water storage tank 19 is fluidly coupled to the outlet 74 of the condenser 70. The feed water storage tank 19 receives a portion of the freshwater produced in the condenser 70. The input 13 of the electric boiler 17 is fluidly coupled to the feed water storage tank 19 for producing freshwater steam. The output 21 of the electric boiler 17 is fluidly coupled to a pre-heater in the evaporator 12 to preheat the salt water 15 entering the evaporator 12. Additionally, the output 21 of the electric boiler 17 is fluidly coupled to the air ejectors 68 to provide operational steam pressure to the air ejectors 68 and household heating system 20.

The water desalination system 54 includes a plurality of valves 76, check valves 78 and gauges 80 that are commonly found in water desalination systems. Additionally, each of the valves 76, check valves 78 and gauges 80 are either electrically controlled or air controlled. In this way each of the valves 76, check valves 78 and gauges 80 can be operated via an extrinsic control system 82 for automating the operation of the evaporator 12 and the water desalination system 54. The voltage and frequencies produced are compatible with existing area grid and equipment ratings. Additionally, the extrinsic control system 82 may be remotely controlled, via radio frequency communication or the like, thereby facilitating the water desalination system 54 to be remotely controlled.

In use, the water desalination system 54 is driven with steam produced by the electric boiler 17, rather than a fossil fuel fired evaporator as is common to conventional water desalination systems. Additionally, the evaporator 12 is powered by the renewable electrical power generation system 24. In this way the cost of supplying fossil fuels to operate the evaporator 12 is eliminated thereby facilitating a cost effective means of desalinating sea water. Moreover, the water desalination system 54 and the evaporator 12 may be scaled down sufficiently to supply an individual home with a fresh water supply, or the water desalination system 54 and the evaporator 12 may be scaled up sufficiently to supply a plurality of homes with a fresh water supply. The valves 76, check valves 78 and gauges 80 of the water desalination system 54 can be automated or be remotely monitored and controlled, thereby eliminating the need to have onsite workers monitoring and controlling the water desalination system 54.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. An electric water desalination assembly being configured to use renewable source of electrical energy to desalinate sea water for producing drinking water, said assembly comprising:
    an evaporator having a fluid input, a steam input and a power input, said steam input being fluidly coupled to an electric boiler, said fluid input being fluidly coupled to a source of salt water wherein said evaporator is configured to boil the salt water into desalinated steam when said evaporator is turned on;
    a renewable electrical power generation system, said renewable electrical power generation system being electrically coupled to said power input of said evaporator for providing power to said evaporator; and
    a water desalination system being configured to desalinate sea water, said water desalination system having an inlet circuit and an outlet circuit, said steam input of said evaporator being fluidly coupled to said inlet circuit wherein said water desalination system is configured to receive the desalinated steam from said evaporator, said outlet circuit being fluidly coupled to a freshwater distribution system wherein said freshwater distribution system is configured to receive freshwater from said water desalination system.

2. The assembly according to claim 1, wherein said renewable electrical power generation system comprises:
    a plurality of wind turbines each being configured to convert wind energy to electrical energy, said plurality of wind turbines having a power output line;
    a solar cell array being configured to be exposed to sunlight for converting solar energy to electrical energy, said solar cell array having a power output line;
    a tidal generator being configured to be positioned in an ocean wherein said tidal generator is configured to convert tidal energy into electrical energy, said tidal generator having a power output line; and
    a bus transfer switch having an input and an output, said output line of each of said plurality of wind turbines, said solar cell array and said tidal generator being electrically coupled to said input of said bus transfer switch wherein said bus transfer switch is configured to receive the electrical energy produced by each of said wind turbines, said solar cell array and said tidal generator.

3. The assembly according to claim 2, further comprising:
    a voltage regulator being electrically coupled to said output of said bus transfer switch wherein said voltage regulator is configured to regulate voltage of the electrical energy produced by each of said wind turbines, said solar cell array and said tidal generator, said voltage regulator being electrically coupled to said power input of said evaporator for providing electrical power to said evaporator; and
    a battery charging system including a battery charger and at least one battery, said battery charger being electrically coupled between said voltage regulator and said battery such that said battery charger charges said at least one battery, said at least one battery being electrically coupled to a DC voltage circuit.

4. The assembly according to claim 1, wherein said water desalination system comprises a plurality of air ejectors, each of said air ejectors being fluidly coupled to said steam input of said evaporator wherein each of said air ejectors is configured to produce vacuum pressure.

5. The assembly according to claim 4, further comprising a condenser having an inlet and an outlet, said inlet of said condenser being fluidly coupled to said outlet of said evaporator for receiving steam from said evaporator wherein said condenser is configured to condense the desalinated steam into freshwater, each of said air ejectors being fluidly coupled to said inlet of said condenser wherein said condenser is configured to receive the vacuum pressure for operational purposes, said outlet of said condenser being fluidly coupled to the freshwater distribution system wherein said condenser is configured to deliver the condensed freshwater to the freshwater distribution system.

6. An electric water desalination assembly being configured to use renewable source of electrical energy to desalinate sea water for producing drinking water, said assembly comprising:
    an evaporator having a fluid input, a steam input and a power input, said steam input being fluidly coupled to an electric boiler
    a renewable electrical power generation system, said renewable electrical power generation system being electrically coupled to said power input of said evaporator for providing power to said evaporator, said renewable electrical power generation system comprising:
        a plurality of wind turbines each being configured to convert wind energy to electrical energy, said plurality of wind turbines having a power output line;
        a solar cell array being configured to be exposed to sunlight for converting solar energy to electrical energy, said solar cell array having a power output line;
        a tidal generator being configured to be positioned in an ocean wherein said tidal generator is configured to convert tidal energy into electrical energy, said tidal generator having a power output line;
        a bus transfer switch having an input and an output, said output line of each of said plurality of wind turbines, said solar cell array and said tidal generator being electrically coupled to said input of said bus transfer switch wherein said bus transfer switch is configured to receive the electrical energy produced by each of said wind turbines, said solar cell array and said tidal generator;
        a voltage regulator being electrically coupled to said output of said bus transfer switch wherein said voltage regulator is configured to regulate voltage of the electrical energy produced by each of said wind turbines, said solar cell array and said tidal generator, said voltage regulator being electrically coupled to said power input of said evaporator for providing electrical power to said evaporator; and
        a battery charging system including a battery charger and at least one battery, said battery charger being electrically coupled between said voltage regulator and said battery such that said battery charger charges said at least one battery, said at least one battery being electrically coupled to a DC voltage circuit; and
    a water desalination system being configured to desalinate sea water, said water desalination system having an inlet circuit and an outlet circuit, said steam input of said evaporator being fluidly coupled to said inlet circuit wherein said water desalination system is configured to desalinate the salt water, said outlet circuit being fluidly coupled to a freshwater distribution system wherein said freshwater distribution system is configured to receive freshwater from said water desalination system, said water desalination system comprising:

a plurality of air ejectors, each of said air ejectors being fluidly coupled to said steam input of said evaporator wherein each of said air ejectors is configured to produce vacuum pressure; and a condenser having an inlet and an outlet, said inlet of said condenser being fluidly coupled to said outlet of said evaporator for receiving steam from said evaporator wherein said condenser is configured to condense the desalinated steam into freshwater, each of said air ejectors being fluidly coupled to said inlet of said condenser wherein said condenser is configured to receive the vacuum pressure for operational purposes, said outlet of said condenser being fluidly coupled to the freshwater distribution system wherein said condenser is configured to deliver the condensed freshwater to the freshwater distribution system.

* * * * *